UNITED STATES PATENT OFFICE 2,590,841

MANUFACTURE OF PYRIDOXIN

Aaron Cohen, Welwyn Garden City, England, assignor to Hoffmann-La Roche Inc., Nutley, N. J., a corporation of New Jersey No Drawing. Application October 1, 1948, Serial No. 52,401. In Great Britain October 9, 1947

4 Claims. (Cl. 260—297)

The present invention is concerned with improvements in or relating to the manufacture of pyridoxin, otherwise known as vitamin $B_6$.

Nystrom and Brown (J. A. C. S. 1947, 69, 1197) have shown that lithium aluminum hydride ($LiAlH_4$) can be used as a reducing agent. These workers have, inter alia, described the reducing of esters to alcohols using this reducing agent and, further, have shown that certain unsaturated aldehydes, ketones and esters can be reduced without affecting the C—C double bond. They also stated that this reagent reduces certain, unspecified, nitrogen heterocycles, but in these cases the C—C double bond was affected.

It has now been found, according to the present invention, that 2-methyl-3-alkoxy or -benzyloxy-4,5-dicarbalkoxy pyridines or the corresponding -3-hydroxy compounds can be reduced by means of lithium aluminum hydride to the corresponding -4,5-bis-(hydroxymethyl)-pyridines, i. e. pyridoxin or its 3-alkoxy or 3-benzyloxy derivative.

Accordingly, a process for the manufacture of pyridoxin is provided which consists in treating a 2-methyl-3-hydroxy-4,5-dicarbalkoxy-pyridine or the corresponding 3-benzyloxy- or 3-alkoxy derivative with lithium aluminum hydride and subsequently removing the benzyl or alkyl component of the group in the 3-position, when present, by hydrogenation or treatment with a hydrogen halide (excepting fluoride) respectively.

The lithium aluminum hydride used as a reagent in the present invention may be prepared by the method of Finholt, Bond and Schlesinger (loc. cit, p. 1199).

The 2-methyl-3-hydroxy-4,5-dicarbalkoxy-pyridines used as initial materials in the present process may readily be prepared according to the method of British Patent Specification No. 556,044 or No. 591,170 using the appropriate starting materials. In the embodiment using such initial materials it is preferred to use 2-methyl-3-hydroxy-4,5-dicarbethoxy-pyridine as the initial material. This may be prepared from N-benzyl-alanine ethyl ester and ethyl formyl succinate.

The 2-methyl-3-alkoxy-4,5-dicarbethoxy-pyridines which may also be used as initial materials may be prepared by hydrolizing the corresponding -4,5-dicyano-derivative which may in turn be prepared according to the method disclosed in the aforementioned patent specifications.

When the reduction yields pyridoxin 3-alkyl ether, the removal of the alkyl component of the 3-alkoxy group is preferably effected by treatment with hydrogen iodide or bromide. If it is desired to use hydrogen chloride it is in general necessary to carry out the treatment under pressure.

The following examples are illustrative of modes of carrying out the invention:

Example 1

A solution of 12.2 parts by weight of 2-methyl-3-hydroxy-4,5-dicarbethoxypyridine in 35 parts by weight of anhydrous ether was gradually added dropwise to a mixture of 5 parts by weight of lithium aluminum hydride in 175 parts by weight of anhydrous ether which was vigorously stirred in a nitrogen atmosphere with cooling at 0° C. The pale yellow precipitate so obtained was stirred with the ether for 1½ hours and decomposed by the slow addition of 100 parts by weight of ice-water followed by a solution of 21 parts by weight of sodium hydroxide in water (50 parts by weight). The resulting gel-like material was filtered under suction. When all the ether had evaporated from the filtrate the yellow aqueous solution was saturated with carbon dioxide. The precipitate was filtered off, and the filtrate submitted to continuous ether extraction for 48 hours. The ether extract was evaporated to dryness leaving an oily product which was treated with alcoholic hydrogen chloride and dry ether and pyridoxin hydrochloride obtained. This compound separated as a crystalline solid M. P. 202° C. with decomposition. Recrystallisation from alcohol yielded vitamin $B_6$ in purer form, M. P. 207° C. with decomposition.

The ether-extracted aqueous portion was acidified with hydrochloric acid, evaporated under reduced pressure to dryness, the residue extracted with hot alcohol and filtered. Concentration of the alcoholic extract gave a further crop of pyridoxin hydrochloride.

Example 2

A solution of 17.15 parts by weight of 2-methyl-3-benzyloxy-4,5-dicarbethoxypyridine in 50 parts by volume of anhydrous ether was added slowly to a stirred solution of 5 parts by weight of lithium aluminum hydride in 300 parts by volume of anhydrous ether while stirring in an atmosphere of nitrogen and cooling in ice water. The reaction mixture was stirred for about 2 hours and then decomposed with ice and aqueous sulphuric acid, and shaken or stirred to obtain two clear layers. The ethereal solution layer was removed and the acid solution made alkaline with an excess of sodium hydroxide while cooling in ice. The alkaline liquid was exhaustively extracted with ether and the ethereal extract dried over sodium sulphate and evaporated. The residue (about 7 parts by weight) could be recrystallised from benzene, or ethyl acetate to yield pure 2-methyl-3-benzyloxy - 4,5 - bis - (hydroxymethyl)-pyridine, M. P. 118–120° C.

A solution of 1 part by weight of this compound in 30 parts by volume of alcohol was mixed with a catalyst prepared by reducing 1 part by volumne of 10% palladium chloride solution with 0.5 part by weight of charcoal. The mixture was shaken in hydrogen at just above atmospheric pressure, and the volume of hydrogen required for hydrogenolysis of the benzyl group was rapidly consumed. After filtering off the catalyst, sufficient hydrochloric acid was added to ensure the formation of the hydrochloride of pyridoxin which was isolated by concentrating the solution and adding acetone or dry ether. The pyridoxin hydrochloride separated as a practically colorless crystalline material; yield 0.65 part by weight M. P. 280° C. (with decomposition).

Example 3

A solution of 34.2 parts by weight of 2-methyl-3-benzyloxy-4,5-dicarbethoxy-pyridine in 100 parts by volume of dry ether was added slowly to a stirred solution of 5.5 parts by weight of lithium aluminum hydride in 400 parts by volume of anhydrous ether while the mixture was kept in an ice-bath with an atmosphere of dry nitrogen. The reaction mixture was stirred at 0° C. for 2 to 3 hours and then treated with 120 parts by volume of 5 N hydrochloric acid at about 0° C.

After stirring the mixture for a further 2 hours, the precipitate was filtered from the ethereal and aqueous layers and the product washed with cold dilute hydrochloric acid and then dry acetone, and dried in vacuo, yielding about 28 parts by weight of 2-methyl-3-benzyloxy-4,5-bis-(hydroxymethyl)-pyridine hydrochloride. This can be purified by crystallisation from dilute hydrochloric acid; M. P. 187° C.

A solution of 43.5 parts by weight of the above hydrochloride in 500 parts by volume of warm water is shaken with hydrogen in the presence of palladium charcoal catalyst prepared by reducing 6 parts by volume of 10% palladium chloride solution with 6 parts by weight of charcoal. When the hydrogen consumption required for hydrogenolysis of the benzyl group was complete, the solution was filtered from the catalyst which was washed with dilute hydrochloric acid. The filtrate was evaporated under reduced pressure, yielding about 28 parts by weight of crude pyridoxin hydrochloride of M. P. 198–202° C., which is purified by recrystallation having a final M. P. of 208° C.

Example 4

A solution of 5.7 parts by weight of 2-methyl-3-methoxy-4,5-dicarbethoxypyridine in 25 parts by volume of anhydrous ether was added gradually to a solution of 1.3 parts by weight of lithium aluminum hydride in 100 parts by volume of anhydrous ether which was stirred in an atmosphere of nitrogen and cooled at 0° C. The reaction mixture was stirred for 1½ hours, and then decomposed with ice-water and made alkaline with an excess of sodium hydroxide. The mixture was extracted with ether giving an ethereal extract which, when dried and freed from solvent, yielded 2-methyl-3-methoxy-4,5-bis-(hydroxymethyl)-pyridine which crystallised from ethyl acetate with M. P. 102° C. in agreement with the description of this compound given by Stiller et al. (J. Amer. Chem. Soc. 1939, 61, 1240).

I claim:

1. A process which comprises reducing a member selected from the group consisting of 2-methyl-3-hydroxy-4,5-dicarbalkoxy-pyridine, 2-methyl-3-alkoxy-4,5-dicarbalkoxy-pyridine, and 2-methyl - 3 - benzyloxy - 4,5 - dicarbalkoxy - pyridine with lithium aluminum hydride to produce the corresponding 4,5-di-(hydroxymethyl)-pyridine.

2. A process which comprises reducing 2-methyl - 3 - hydroxy - 4,5 - dicarbethoxy - pyridine with lithium aluminum hydride to produce 2-methyl - 3 - hydroxy - 4,5 - di - (hydroxymethyl)-pyridine.

3. A process which comprises reducing 2-methyl - 3 - alkoxy - 4,5 - dicarbethoxy - pyridine with lithium aluminum hydride to produce 2-methyl-3-alkoxy-4,5-di-(hydroxymethyl)-pyridine.

4. A process which comprises reducing 2-methyl-3-benzyloxy-4,5-dicarbethoxy-pyridine with lithium aluminum hydride to produce 2-methyl-3-benzyloxy-4,5-di-(hydroxymethyl)-pyridine.

AARON COHEN.

REFERENCES CITED

The following references are of record in the file of this patent:

UNITED STATES PATENTS

| Number | Name | Date |
| --- | --- | --- |
| 2,248,078 | Harris | July 8, 1941 |
| 2,266,754 | Harris | Dec. 23, 1941 |
| 2,286,915 | Kuhn | June 16, 1942 |
| 2,310,167 | Carlson | Feb. 2, 1943 |

OTHER REFERENCES

Nystrom, J. Amer. Chem. Soc., vol. 69 (1947), pp. 1197–1199.

Cavallito, J. Amer. Chem. Soc., vol 66, July 1944, pp. 1166–1171.